United States Patent [19]

Mosher

[11] 3,735,402
[45] May 22, 1973

[54] PORTABLE RADAR SYSTEM
[75] Inventor: Richard K. Mosher, Sudbury, Mass.
[73] Assignee: Kimball Products Company, Inc., Sudbury, Mass.
[22] Filed: Mar. 4, 1971
[21] Appl. No.: 120,928

[52] U.S. Cl. .................................................. 343/14
[51] Int. Cl. ................................................ G01s 9/24
[58] Field of Search ........................... 343/14, 17.5

[56] References Cited

UNITED STATES PATENTS

| | | | |
|---|---|---|---|
| 2,581,847 | 1/1952 | Espenchied et al. | 343/14 |
| 2,659,878 | 11/1953 | Meeker et al. | 343/14 |
| 2,966,676 | 12/1960 | Fox | 343/14 |
| 2,622,241 | 12/1952 | Keizer | 343/14 |
| 3,500,403 | 3/1970 | Fuller | 343/14 |
| 3,054,104 | 9/1962 | Wright et al. | 343/14 |

Primary Examiner—Benjamin A. Borchelt
Assistant Examiner—G. E. Montone
Attorney—Weingarten, Maxham & Schurgin

[57] ABSTRACT

A portable, direct distance readout, FM-CW radar especially adapted for small craft use in which relative target distance is measured independent of Doppler effects produced by relative target velocity. An indication may be provided of whether the relative target distance is opening or closing. The invention also includes compensation for modulation nonlinearity errors in the final readout.

13 Claims, 4 Drawing Figures

PATENTED MAY 22 1973        3,735,402

INVENTOR
RICHARD K. MOSHER
BY
Weingarten, Maxham & Schurgin
ATTORNEYS

PORTABLE RADAR SYSTEM

FIELD OF THE INVENTION

This invention relates to radar systems and in particular to portable direct readout FM-CW radar.

BACKGROUND OF THE INVENTION

FM-CW radar systems are well known in the prior art and operate, generally, by varying the frequency of a transmitted microwave radar signal in a linear fashion and detecting the instantaneous frequency difference between the transmitted and received echo signals; the frequency difference providing an indication of transit time for the transmitted signal from radar antenna to target and back to radar antenna. From this transit time relative target distance may be calculated.

Typical FM-CW radar systems of the prior art are shown in U.S. Pat. Nos. 2,881,422; and 2,451,822. One of the main problems with FM-CW radar systems of this type is their sensitivity to Doppler effects induced by relative target velocity causing the resulting beat frequency to show an error component in addition to the frequency component proportional to distance. While the above U.S. Pat. No. 2,451,822 has overcome this defect by providing for offsetting positive and negative Doppler shift effects, this has been achieved only through the use of expensive, bulky, and difficult to tune delay networks with a plurality of separate radar transmitting and receivers.

In U.S. Pat. No. 2,881,422, the rate of change of frequency of the transmitted radar signal is made sufficiently high so that the resulting beat frequency between the transmitted and received signals is large and the resulting Doppler frequency error insignificantly small. One problem with such a system, however, is that the high rate of change of the transmitted radar signal frequency aggravates other system errors attributable to switching and nonlinearities in the modulating signal. In addition, accurate use of such a system is limited to relatively short distances, such as in aircraft low level altimetry, and is unsatisfactory for use with distances encountered in applications such as small craft navigation.

To overcome or minimize these problems and to provide small craft users with satisfactory radar navigation tools has required expensive and elaborate radar signal generation circuitry that provides control over critical frequency sweep characteristics. This, in conjunction with signal sources constraints imposed by FCC stability requirements, has increased cost beyond the point of practicality for small craft users.

SUMMARY OF THE INVENTION

A portable, accurate radar system is provided with is especially suitable for small craft use in determining relative distance and bearing of reflective targets up to a few miles distant. The radar system can be hand held and sufficiently requires but few components, with a result that the cost and size of the system is compatible with the needs of small craft enthusiasts who otherwise find navigational radar out of financial reach. A CW radar signal is transmitted by a hand held or other antenna and is frequency modulated by an efficiently generated triangle wave having a relatively long period of approximately one tenth second. The radar echo is heterodyned with the instantaneously transmitted radar beam to produce a beat frequency.

Over the course of a cycle of the modulating triangle wave the beat frequency will vary considerably due to both Doppler effects and radar signal sweep rate non-linearities. Two systems are provided to compensate for the effects of Doppler shift and variations in a radar signal frequency sweep rate.

According to one scheme, accurate average detection is possible by manually adjusting the frequency of a separate audio oscillator such that average pitch of the beat frequency and audio oscillator appear the same to the listener. This subjective measurement achieves its accuracy in part through the cooperation of the modulating triangle wave shape and its frequency. The low triangle wave frequency, furthermore, reduces the switching transients in the beat frequency due to modulating signal slope reversals.

According to a further system a direct readout of distance is provided by having the beat frequency converted to a constant amplitude unipolar pulse train having a period, which is the same as, or twice the period of, the beat frequency. The average period of the unipolar pulses is detected by application of the pulse train to a meter that possesses sufficient inertia to provide suitable averaging over the one tenth second period of variation to yield an accurate meter reading proportional to target distance.

By averaging the pulses over one or more selected half cycles of the modulating triangle wave and comparing this average to the average taken over one or more full cycles used to indicate distance, an indication of relative target motion (closing or opening) is provided.

Radar signal frequency stability requirements of FCC regulations are strict and cannot usually be maintained by portable power sources, such as batteries, as they degenerate with age. To provide required stability inexpensively, a novel, accurate, and simple voltage regulation system is provided to insure sufficiently constant voltage supply levels throughout the radar system circuitry and to eliminate any error in the beat frequency attributable to supply voltage variation and battery aging.

DESCRIPTION OF THE DRAWINGS

A more complete understanding of the features and operation of the present invention will be obtained by reference to the following detailed description of a preferred embodiment presented for purposes of illustration and to the accompanying drawings of which.

DETAILED DESCRIPTION OF THE PREFERRED EMBODIMENT

Figure 1:
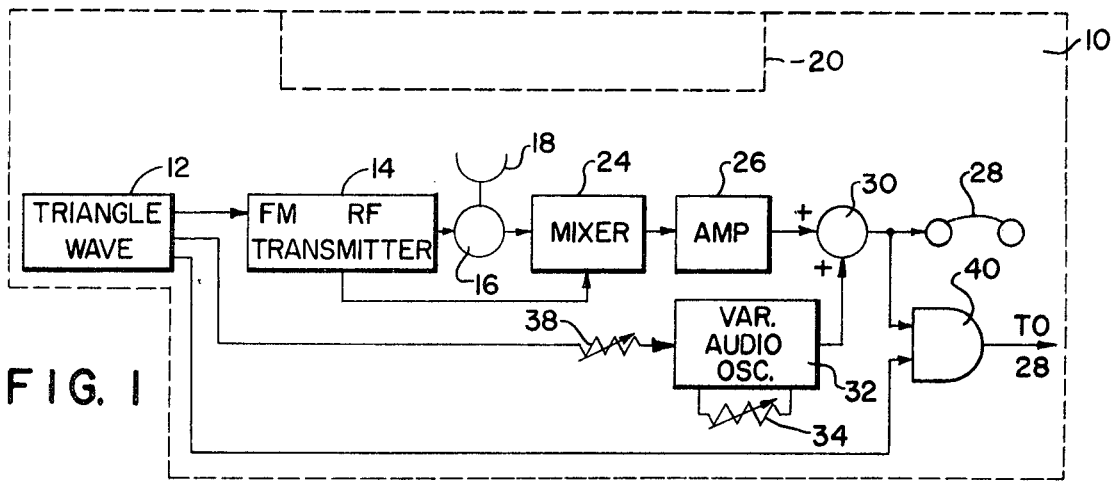
FIG. 1 is a partial block and partial schematic diagram of a basic portable radar system.

Referring to FIG. 1 there is shown in block diagram and partial schematic form a portable FM-CW radar system housed within a container 10 and comprising a source 12 of a 10 Hz triangle wave used as an FM modulation for and conducted to an FM-CW transmitter 14 normally operating in the radar frequency spectrum. Transmitter 14 has its frequency varied in accordance with the amplitude of the triangle wave from the source 12. The resulting FM-CW output from the transmitter 14 is applied to a wave separator 16 which directs the excitation from transmitter 14 to a portable directional antenna 18, mounted within container 10 and aimed to direct and receive radar signals through a transmissive portion 20 of container 10. Echo reflections received by the directional antenna 18 from objects struck by the emitted radar signal are returned to the wave separator 16 where they are directed to a mixer 24. There, the received echo radar signals are multiplied by the instantaneous frequency of the transmitted FM-CW radar signal. The resulting beat frequencies are passed through a low-pass filtering amplifier 26 which selects the lower of the beat frequencies from the mixer 24 for amplification and application to a pair of user headphones 28 through a summer 30.

A further input of the summer 30 is provided from a variable frequency audio oscillator 32 having a manually adjusted frequency control 34. The triangle wave output of the triangle wave source 12 may be similarly fed through a rheostat 38 as a frequency control input into the variable frequency audio oscillator 32.

As is understood, basic FM-CW radar operation depends upon the production of a constant tone beat note from the mixing of the transmitted and received radar signals. To obtain constancy in this note, the frequency of the transmitted radar signal must vary linearly with time and normally this is achieved with a linear modulation by a sweep signal. With completely linear FM modulation, the received radar echo will differ in frequency from the transmitted radar signal by a constant frequency during each edge of the modulating sweep signal so that mixing of the received and transmitted signals results in a constant beat frequency tone, the frequency of which is directly proportional to the distance between the transmitting radar antenna and the reflecting target.

In theory this principle works well and in sophisticated, expensive radar systems where sweep and modulation linearity can be accurately maintained through expensive generating circuits the theoretical functioning is achieved.

With less complex and less sophisticated radar transmission and modulation systems, substantial variation in the beat frequency is produced even from small linearity variations in the radar signal frequency sweep rate. A listener, through the earphones 28, hears a pronounced wobble in the audio frequency. It has been discovered, however, that despite the effect of this wobble or periodic variation in the frequency of the audio note produced by the beating of the transmitted and received radar signal it is possible for the listener to compare it with the audio frequency note from the variable oscillator 32, if the period of the wobble is properly chosen. The radar user can accurately adjust the frequency of the variable oscillator 32 so that its frequency appears equal to the average wobbling beat note. The resulting setting of the control 34 can be calibrated in terms of target distance to provide an accurate indication of that distance.

An alternative system providing an improvement can be achieved by effectively varying the frequency of the audio oscillator 32 in relation to the amplitude of the triangle wave from source 12. Since the frequency of the beat note from the mixer circuit 24, for a given target distance, depends upon the slope of the modulating triangle wave from source 12 and since that slope normally varies with the magnitude of the triangle wave it is possible to slightly vary the frequency output of the audio oscillator 32 in accordance with the amplitude of the triangle wave to provide a wobble in the output of oscillator 32 that matches the beat note wobble. By adjusting, through the resistor 38, the amplitude of the triangle wave applied to vary the frequency of the audio oscillator 32 its output can be made to wobble to substantially the same degree as the beat note. With the frequency variations in the beat note and the output of the audio oscillator 32 more closely matched it is easier to vary the center frequency of the oscillator 32 to match the center frequency of the beat note from circuit 24.

As is known, when the target moves relative to the transmitting antenna 18 a Doppler shift is induced in the frequency of the echo radar signal causing it to change from the frequency of the transmitted signal before reflection by the target. The result is a change in the beat frequency from the mixer 24 which is proportional to the relative target velocity. With the use of the triangle wave from source 12 having equal positive and negative slopes for modulating the radar signal, the Doppler shift change in the beat frequency will be equal and opposite during opposite slopes of the triangle wave with the net variation in frequency averaging to zero over a full cycle of the triangle wave. It is accordingly still possible for the listener, using the headphones 28, to adjust the frequency from the variable audio oscillator 32 so that its frequency appears to be an average of the frequency of the beat note from the circuit 24.

The 10 Hz frequency of the triangle wave from source 12 is both high and low enough so that the resulting two beat tones produced during Doppler effects can be independently perceived by the listener and the frequency of the audio oscillator 32 accurately adjusted at an average of the two beat tone frequencies. The modulating frequency is also sufficiently low so that the beat note disturbances produced by slope reversals in the modulating triangle wave are acceptably minimal.

With the target relative velocity such that it is approaching the radar antenna 22 the beat frequency will, depending upon the slope of the triangle wave, be either higher or lower, and with the target receding the opposite change in beat frequency is experienced. A modification may be added to FIG. 1 in order to detect the direction of the relative target velocity. A gate 40 is provided to receive on one input the output of the summer 30 and on another input a gating signal from the triangle wave source 12. The output of the gate 40 is fed to the earphones 28. The gate 40 selectively functions to pass the output of the summer 30 to the headphones 28 only during a predetermined slope of the triangle wave from source 12.

Gate 40 is first continuously enabled for the listener to adjust the frequency from the audio oscillator 32 to the apparent average of the higher and lower portions of the beat note at headphones 28. The listener is then able, by causing the gate 40 to provide listening only during one slope of the triangle wave, to determine whether the target is approaching him or receding from him. This is done by detecting whether the average beat note during that slope of the triangle wave is higher or lower than the frequency from oscillator 32.

Figure 2:
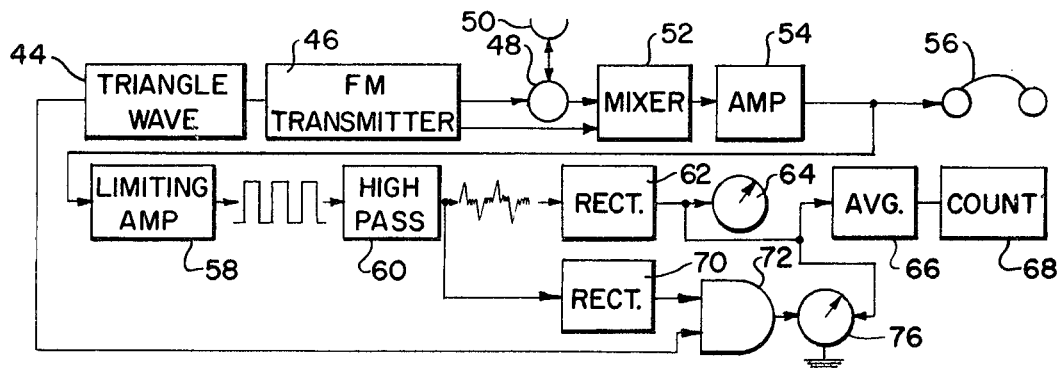
FIG. 2 is a block diagram of direct distance and relative target velocity indicators according to the invention.

The block diagram and partial schematic of FIG. 2 shows a portable radar system operating in a manner similar to FIG. 1 but, by the inclusion of further processing electronics, being adapted to give a direct meter indication of distance. A source 44 of a triangle wave modulating signal outputs a triangle wave to FM modulate a radar transmitter 46 operating with a center frequency in the microwave radar range and having its output frequency varied in accordance with the amplitude of the triangle wave. The output of the transmitter 46 is fed to a signal separator 48 and thence to a portable hand held radar antenna 50 for transmission in a substantially narrow beam in a direction determined by the operator. A received radar echo signal is picked up by the antenna 50 and fed through the signal separator 48 to a mixer 52 where the received echo, and the transmitted radar signal are heterodyned to produce a beat note, the beat note is amplified by an amplifier 54 and may be applied to a set of earphones 56. The operation of the circuitry of FIG. 2 up to this point is substantially similar to the operation of the radar system explained in FIG. 1.

The output of the amplifier 54 is also fed to a high gain limiting amplifier 58 where, by appropriate amplification, it is converted to a square wave signal having relatively steep rising and falling characteristics. The output of the limiting amplifier 58 is fed to a high-pass filter 60 which outputs a series of positive and negative constant amplitude pulses corresponding to the rising and falling slopes of the square wave from limiting amplifier 58. A full or half wave rectifier 62 receives the train of pulses and outputs a unipolar pulse train wherein the pulses of the opposite polarity are either clipped or inverted. The output of the rectifier 62, the unipolar pulse train, is fed to a DC current meter 64 wherein the inertia of the needle movement operates effectively to continuously average the number of pulses. The frequency of the modulating triangle wave is low enough so that the meter 64 can accurately average the higher and lower frequency components in the unipolar signal from rectifier 62 without significant effects from triangle wave slope reversal disturbances. The triangle wave frequency is high enough so that meter wobble can be sufficiently eliminated.

Alternatively an averaging circuit 66 is provided to receive the output of the rectifier 62 and to pass pulses therefrom to a counter 68 during one or more complete cycles of the triangle wave. Counter 68 displays a digital total proportional or equal to distance depending on the adjustment of circuit parameters.

The effect of averaging over one or more full cycles of the triangle wave from source 44 is to balance and cancel effective variations in the beat note from mixer 52 produced by both nonlinearities in the radar frequency sweep rate and Doppler shift effects. With a constant FM radar frequency deviation and triangle wave period, the Doppler shift will be equal and opposite during opposite slopes of the triangle wave from source 44 so that averaging over at least a full period will cancel the changes in pulse spacing from rectifier 62 attributable to the Doppler effect. The changes in the pulse spacing from rectifier 62 attributable to nonlinearities in the sweep are also averaged.

In order to determine whether a target is approaching or receding from the user a further processing system is employed comprising a rectifier 70 receiving the output of the high-pass filter 60 and feeding a gate 72 controlled by an input from the source 44. The output of the gate 72 is fed to one input of a differential meter 76 with the other input of the differential meter 76 fed from the output of the rectifier 62.

The output of the gate 72 is the pulses from the rectifier 70 during a predetermined slope of the triangle wave while the output of the rectifier 62 is the pulses from rectifier 62 over at least a full cycle of the triangle wave. In this manner the difference between the outputs from the rectifier 62 and and gate 72 represents the Doppler shift on the received radar echo signal and the reading of the differential meter 76 therefore represents this Doppler shift. By making the rectifier 62 half wave and rectifier 72 full wave, gain compensation is established so that the direction in which the meter 76 points can be used as an indication of whether the target is approaching or receding from the user with the amplitude indicating relative velocity.

Several modifications are possible to the FIG. 2 circuitry to achieve the indicated operation and these modifications include the use of differential meter 76 as both the range and relative velocity indicator by operating the gate 72 to inhibit all pulses from the rectifier 70 during the range measurement. It is also possible to feed the output of rectifier 62 directly to the gate 72 without a second rectifier 70 by providing compensating gain elsewhere in the circuit. Finally, the meter 64 may be used alone for both range and relative velocity, with gain compensation, by switching the meter 64 between outputs of rectifier 62 and gate 72 and detecting whether the meter reads higher or lower when receiving the output of gate 72.

The circuitry of FIG. 2 provides a function similar to that of FIG. 1 but with direct readout of distance and relative velocity information. Both circuits are useful over a range of distances up to a few nautical miles from as close as several yards.

Figure 3:
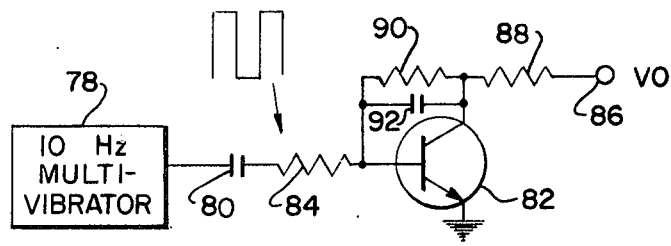
FIG. 3 is a partial block and partial schematic diagram of circuitry for providing the modulating triangle wave used in the invention.

An inexpensive circuit for producing a sufficiently accurate triangle wave for use in modulating the radar transmitters 14 and 46 is shown in partial block and partial schematic diagram in FIG. 3. A multivibrator 78 provides a saturated 10 Hz square wave which is fed through a coupling capacitor 80 into the base of a grounded emitter NPN transistor 82 through a resistor 84. The collector of the transistor 82 is connected to a regulated source of positive potential 86 through a resistor 88 and is further connected to the base of transistor 82 through a parallel combination of a biasing resistor 90 and integrating capacitor 92. With the high gains presently obtainable in state of the art single transistors, the signal at the collector of transistor 82 is a triangle wave of sufficient linearity for use in the radar systems of FIGS. 1 and 2 when nonlinearities in that signal are compensated as indicated.

Figure 4:
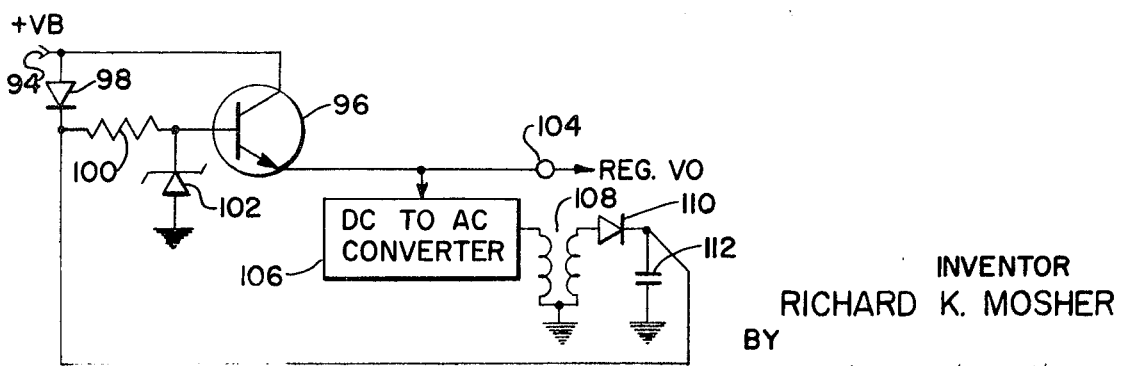
FIG. 4 is a partial block and partial schematic diagram of a power supply regulator according to the invention.

With a radar system adapted for portable use, it is necessary that a battery or similar device be provided to operate the circuitry. Inherent in all batteries is a gradual decrease in voltage as the battery charge diminishes. Such a potential reduction will cause a change in the FM radar signal frequency and frequency deviation rate which decalibrate the radar system. This problem is uniquely overcome by a novel voltage regulator circuit shown in FIG. 4 having economy of components and adapted for use with a portable radar system indicated in FIGS. 1–3. The positive output of a battery 94 is supplied to the collector of an NPN transistor 96 and is supplied serially through a diode 98 in the forward direction and a resistor 100 to the base of the transistor 96. A regulating zener diode 102 is connected from the base of transistor 96 to the negative, common terminal of the battery 94 and is oriented to provide reverse, breakdown conduction from the base of transistor 96 to the common point.

The emitter of transistor 96 is connected and supplies current to a terminal of regulated voltage 104 for operating the radar system circuitry of FIGS. 1–3. This voltage will remain constant only as long as the zener current remains constant. However, since the zener current is supplied from the battery through diode 98 and resistor 102, the amount of current through the zener will drop as the battery voltage drops. To eliminate this effect the voltage at 104 is also used to feed a transformer coupled saturating type of DC to AC converter 106 and 108 which outputs an AC signal proportional to the voltage on the emitter of transistor 96. This AC signal is boosted in voltage level by a transformer 108 which has an output to a rectification circuit composed of a diode 110 and smoothing capacitor 112. The DC output on the capacitor 112 is adjusted by the amplification of transformer 108 so that it exceeds the maximum voltage expected out of the battery 94. This voltage across the capacitor 112 is returned to the junction between the diode 98 and resistor 100 where it operates to supply regulated current to regulating diode 102.

Since the voltage supplied from diode 110 and capacitor 112 is always greater than the battery supply voltage, diode 98 becomes reverse biased and cuts off all current from the battery. Thus, a constant current is supplied to zener 102 and it does not vary in voltage as the battery voltage drops with age and the emitter output of transistor 96 will remain essentially constant until the battery voltage drops to the voltage of this emitter.

Diode 98 is required only when the regulation circuit is initially turned on. The diode 98 provides forward conduction from the battery 94 to the regulating zener diode 102 so that upon turn on an initial output is established at the emitter of transistor 96 to start the operation of the DC to AC converter 106. Since the DC output from capacitor 112 is always greater than the output from the emitter of transistor 96, the regulator bootstraps itself up in voltage until the zener 102 turns on. Diode 98 is then turned off and the regulator's output voltage remains constant, independent of battery age.

It will be appreciated by those skilled in the art that while specific circuit elements and functional blocks have been indicated to exemplify a system according to the invention, others may be substituted that provide similar operation. It is also clear, that while specific values have been indicated, particularly with reference to frequencies of operation, other frequencies and values can be applied without departing from the functional advantages indicated above. It is accordingly intended to limit the scope of the invention only as specified in the following claims.

What is claimed is:

1. A radar system to provide an operator with an indication of the distance of remote objects comprising:

means for generating a triangle wave;
    means for transmitting a radar signal and for receiving reflections of said transmitted signal from a remote object;
    means for FM-CW modulating said radar signal with said triangle wave;
    means responsive to said transmitted and received radar signals for deriving signals at frequencies representative of the difference between the frequency of the transmitted and received signals;
    means for providing as the period of said triangle wave a period which is long in relation to the duration of switching transients in said derived signal produced by slope reversals in said triangle wave;
    means for developing a signal variable over a range of frequencies substantially coextensive with the range of said derived signals;
    means for allowing said operator to acoustically monitor said derived signals and said developed signals; and
    control means for adjusting the frequency of said developed signal whereby said operator can adjust the frequency of said developed signal as monitored to appear as the average frequency of said derived signal and whereby the setting of said control means provides an indication of the distance of said remote object.

2. The system of claim 1 wherein the period of said triangle wave is long relative to the period of audible sound.

3. The radar system of claim 1 wherein said means for generating a triangle wave further includes:

means for generating a square wave; and
    a single stage of electronic amplification receiving said square wave at a control input thereof and having negative resistive and capacitive feedback to said control terminal from a terminal of amplified response to the signal on said control terminal;
    said triangle wave being produced at said terminal of amplified response.

4. The radar system of claim 1 further including a source of regulated power for operating said radar system, said source comprising:

a portable power source providing operating potential which diminishes with source use;
    an active element providing controlled conduction between first and second terminals thereof in response to a signal on a third terminal thereof and having said first terminal connected to a terminal of said portable source;
    a DC to AC converter receiving as an input the signal at said second terminal of said active element and providing as an output an AC signal having a peak magnitude substantially higher than the signal level from said portable source;
    means for developing a DC signal substantially equal to the peak output of said DC to AC converter;
    means for regulating said developed DC signal at a regulated, lower signal level and for applying said regulated signal level to the control terminal of said active element; and
    means for conducting a signal from said portable source to said means for regulating said developed DC signal whenever said developed DC signal is at a level less than the level of said portable source;
    the second terminal of said active element providing regulated power for the operation of said radar system independent of the past use of said portable source.

5. The radar system of claim 1 further including means for selectively enabling said monitor means during one slope of the triangle wave output of said generating means.

6. A radar system for providing an indication of the distance of remote objects comprising:
   means for generating a triangle wave having positive and negative slopes;
   means for transmitting radar signals and for receiving reflections of said radar signals from said remote objects;
   said transmitted radar signals having the frequency thereof varied with the level of said triangle wave;
   means for developing a signal having a frequency representative of the instantaneous frequency difference between said transmitted and received radar signals;
   means for providing as the period of said triangle wave a period which is of substantial duration relative to the duration of switching transients in said developed signal resulting from slope reversals in said triangle wave;
   means for amplitude limiting said signal developed at said difference frequency;
   means for high-pass filtering said amplitude limited signal;
   means for rectifying said high-pass filtered signal to produce a first train of pulses at a rate representative of said instantaneous frequency difference; and
   means for indicating the average number of said pulses in said first train of pulses during one or more whole cycles of said triangle wave to provide an indication of the relative distance of said remote objects.

7. The radar system of claim 6 wherein said means for generating a triangle wave comprises:
   means for producing a signal which has high and low saturation levels and which periodically switches from one saturation level to the other with an interval between switching of one half the period of said triangle wave;
   an active element having first and second terminals of controlled conduction therebetween and a control terminal operative in response to said signal with high and low saturation levels to control conduction between said terminals of controlled conduction; and
   a path of negative resistive and capacitive feedback from one of said first and second terminals to said control terminal;
   said triangle wave being produced at one of said first and second terminals.

8. The radar system of claim 7 further including a source of regulated power for operating said radar system, said source comprising:
   a portable power source providing operating potential which diminishes with source use;
   an active element providing controlled conduction between first and second terminals thereof in response to a signal on a third terminal thereof and having said first terminal connected to a terminal of said portable source;
   a DC to AC converter receiving as an input the signal at said second terminal of said active element and providing as an output an AC signal having a peak magnitude substantially higher than the signal level from said portable source;
   means for developing a DC signal substantially equal to the peak output of said DC to AC converter;
   means for regulating said developed DC signal at a regulated, lower signal level and for applying said regulated signal level to the control terminal of said active element; and
   means for conducting a signal from said portable source to said means for regulating said developed DC signal whenever said developed DC signal is at a level less than the level of said portable source;
   the second terminal of said active element providing regulated power for operation of said radar system.

9. The radar system of claim 6 further including a source of regulated power for operating said radar system, said source comprising:
   a portable power source providing operating potential which diminishes with source use;
   an active element providing controlled conduction between first and second terminals thereof in response to a signal on a third terminal thereof and having said first terminal connected to a terminal of said portable source;
   a DC to AC converter receiving as an input the signal at said second terminal of said active element and providing as an output an AC signal having a peak magnitude substantially higher than the signal level from said portable source;
   means for developing a DC signal substantially equal to the peak output of said DC to AC converter;
   means for regulating said developed DC signal at a regulated, lower signal level and for applying said regulated signal level to the control terminal of said active element; and
   means for conducting a signal from said portable source to said means for regulating said developed DC signal whenever said developed DC signal is at a level less than the level of said portable source;
   the second terminal of said active element providing regulated power for the operation of said radar system.

10. The radar system of claim 6 further comprising:
    means for developing a second train of pulses representative of said instantaneous frequency difference during one of said slopes of said triangle wave; and
    means for comparing the average number of said pulses in said first train with the average number of said pulses in said second train to provide an indication of the relative velocity of said remote objects.

11. The radar system of claim 6 further including means for providing acoustical monitoring of said developed signal.

12. A radar system for providing an operator with an indication of the distance of remote objects comprising:
    means for producing a fixed repetition rate slightly nonlinear sweep signal;
    means for transmitting radar signals and for receiving reflections of said radar signals from said remote objects;
    the frequency of said transmitted radar signals being controlled in response to the level of said sweep signal to provide a transmitted signal frequency varying nonlinearly with time;

means for developing signals at frequencies representative of the instantaneous difference in frequency between said transmitted and received radar signals;

means for generating signals at frequencies within a range of selectable frequencies substantially coextensive with the expected range of said difference frequencies;

means for manually adjusting the frequency of said generating means within said range of selectable frequencies, said adjusting means providing an indication of its setting;

adjustable means operative with said generating means for automatically varying the frequency of said generated signals in response to the level of said sweep signal; and means for permitting said operator to compare the frequency of said developed signals with the frequency of said generated signals whereby the frequency of the signal from said generating means may be adjusted for minimum apparent variation from the frequency of said developed signals and whereby the indicated adjustment of the frequency of said generating means provides an indication of the distance of said remote objects;

said adjustable means for automatically varying the frequency of said generated signals further including means operative to provide a variation in the frequency of said generated signals which may be adjusted to substantially match the variation of said developed signals attributable to the nonlinearities in the variation of the frequency of said transmitted radar signals with time.

13. The radar system of claim 12 further comprising means for permitting said operator to compare the frequency of said developed signals with the frequency of said generated signals during selected portions of a single slope of said sweep signal whereby said operator obtains an indication of the relative velocity of said remote object.

* * * * *

UNITED STATES PATENT OFFICE
CERTIFICATE OF CORRECTION

Patent No. 3,735,402              Dated May 22, 1973

Inventor(s) Richard K. Mosher

It is certified that error appears in the above-identified patent and that said Letters Patent are hereby corrected as shown below:

ABSTRACT, line 8, "final readout" should read
--final distance readout--.

Column 1, line 54, "provided with is" should read
--provided which is--.

Signed and sealed this 10th day of December 1974.

(SEAL)
Attest:

McCOY M. GIBSON JR.          C. MARSHALL DANN
Attesting Officer            Commissioner of Patents